US007200545B2

(12) United States Patent
Lines et al.

(10) Patent No.: US 7,200,545 B2
(45) Date of Patent: Apr. 3, 2007

(54) SYSTEM AND METHOD FOR SIMULATING COMPUTER NETWORK DEVICES FOR COMPETENCY TRAINING AND TESTING SIMULATIONS

(75) Inventors: Vardell Lines, American Fork, UT (US); Don Whitnah, Orem, UT (US)

(73) Assignee: TestOut Corporation, Pleasant Grove, UT (US)

( * ) Notice: Subject to any disclaimer, the term of this patent is extended or adjusted under 35 U.S.C. 154(b) by 767 days.

(21) Appl. No.: 10/330,700

(22) Filed: Dec. 26, 2002

(65) Prior Publication Data

US 2003/0125924 A1 Jul. 3, 2003

Related U.S. Application Data

(60) Provisional application No. 60/343,935, filed on Dec. 28, 2001.

(51) Int. Cl.
*G06F 9/44* (2006.01)

(52) U.S. Cl. .................... 703/21; 703/14; 434/118; 434/350; 434/322; 706/46; 709/204

(58) Field of Classification Search .............. 703/21, 703/14, 20; 370/389, 216, 241; 707/501.1; 709/315, 231, 223, 204; 750/1; 725/105; 345/156; 434/118, 350, 322; 706/46, 47; 717/104; 705/2

See application file for complete search history.

(56) References Cited

U.S. PATENT DOCUMENTS 5,907,696 A 5/1999 Stilwell et al.

| 6,766,311 | B1* | 7/2004 | Wall et al. ..................... 706/46 |
|---|---|---|---|
| 7,016,949 | B1* | 3/2006 | Tagawa ........................ 709/223 |
| 2001/0044851 | A1* | 11/2001 | Rothman et al. ............ 709/231 |
| 2001/0049594 | A1* | 12/2001 | Klevans ........................ 703/14 |
| 2001/0051862 | A1* | 12/2001 | Ishibashi et al. .............. 703/14 |
| 2002/0055853 | A1* | 5/2002 | Macleod et al. ............... 705/1 |
| 2002/0059054 | A1* | 5/2002 | Bade et al. .................... 703/20 |
| 2002/0059376 | A1* | 5/2002 | Schwartz ...................... 709/204 |

(Continued)

OTHER PUBLICATIONS

Duncombe, "Network management training for tactical systems", IEEE 1997.*

(Continued)

*Primary Examiner*—Kandasamy Thangavelu
(74) *Attorney, Agent, or Firm*—Thorpe North & Western LLP

(57) ABSTRACT

A system and method is provided for simulating computer network devices. The method executes a user interface which presents a scenario which includes tasks a user is to perform by interacting with one or more simulated network devices. A network diagram having icons displays a network topology. By selecting an icon a simulated network device is executed and a communication interface to the simulated network device is opened. Commands to the simulated network device issued through the communication interface are interpreted and responded to in substantially the same manner as a corresponding actual network device. In addition, for each simulated network router a routing table is generated and maintained to allow the simulated network devices to respond to commands as realistically as possible. Tasks completed by a user are monitored and evaluated to determine whether the user successfully completed the required tasks.

31 Claims, 6 Drawing Sheets

U.S. PATENT DOCUMENTS

| | | | |
|---|---|---|---|
| 2002/0091726 A1* | 7/2002 | Macleod et al. | 707/501.1 |
| 2002/0101824 A1* | 8/2002 | Ziedman | 370/241 |
| 2002/0106622 A1* | 8/2002 | Osborne et al. | 434/350 |
| 2002/0130834 A1* | 9/2002 | Madarasz et al. | 345/156 |
| 2002/0138847 A1* | 9/2002 | Abrams et al. | 725/105 |
| 2002/0192623 A1* | 12/2002 | Sather et al. | 434/118 |
| 2003/0005171 A1* | 1/2003 | Schaeffer | 709/315 |
| 2003/0009742 A1* | 1/2003 | Bass et al. | 717/104 |
| 2003/0061070 A1* | 3/2003 | Kelly et al. | 705/2 |
| 2003/0084015 A1* | 5/2003 | Beams et al. | 706/47 |
| 2003/0091970 A1* | 5/2003 | Fast et al. | 434/322 |
| 2003/0112800 A1* | 6/2003 | Grech et al. | 370/389 |
| 2003/0137930 A1* | 7/2003 | Futernik | 370/216 |

OTHER PUBLICATIONS

Montane et al., "Specialized certification programs in computer science", ACM 2001.*

Yamamoto et al., "An experimental study on distributed virtual environment for integrated training system on machine maintenance", IEEE 1999.*

Papa et al., "Broadband cellular radio telecommunication technologies in distance learning: A human factors field", ACM 2001.*

RouterSim Interactive Simulation-Based Training.

Boson Router Simulator.

Certification Magazine CertMag.com Learning Tools: Ral, (Almost) Live Learning, pp. 1-4.

* cited by examiner

SYSTEM AND METHOD FOR SIMULATING COMPUTER NETWORK DEVICES FOR COMPETENCY TRAINING AND TESTING SIMULATIONS

This application claims priority to U.S. Provisional Application Ser. No. 60/343,935 filed on Dec. 28, 2001 as SYSTEM AND METHOD FOR SIMULATING A NETWORK OF ROUTERS FOR EDUCATIONAL AND COMPETENCY TRAINING.

FIELD OF THE INVENTION

The present invention relates generally to the field of computer simulators. More specifically, the present invention relates to a system and method for simulating computer network devices for competency training and testing simulations.

DESCRIPTION OF RELATED BACKGROUND ART

Computers and information technology are quite complex. From the software and middleware to the hardware and physical connections for communicating between machines, the technologies such as hardware, protocols, languages, software packages, and software standards involved is large and changes rapidly. Accordingly, companies, governments, associations and other organizations rely on proficient programmers, network administrators, database administrators, and other IT (Information Technology) professionals to keep their computer systems functioning properly and efficiently.

To become and remain employable, these IT professionals must be able to keep up and prove they can provide the services the employer seeks, often before being offered an IT employment position. To provide the credentials demanded by employers, the IT industry uses certification exams, particularly in the software industry. This effort is often led by vendors of the different technologies. The certification asserts that the vendor considers the certificate holder competent to use and maintain the IT technology being certified. Novell®, Microsoft®, Cisco® and others offer certification exams such as CNE (Certified NetWare Engineer), MCP (Microsoft Certified Professional), MCSE (Microsoft Certified Systems Engineer), CCNA (Cisco Certified Network Associate) and the like.

However, conventional certification exams that use multiple choice and fill-in-the-blank questions are limited in their ability to measure behavioral skills of an examinee. In certain technologies, such as network devices the best measure of an examinee's aptitude is by measuring the examinee's interaction with a real network device. In a training course or certification exam, interaction with real network devices of a real network may be impractical, expensive, or both.

The certification exams of today test an examinee's competence by using a simulation of the particular technology. The examinee uses the simulation to perform a specific task. If the required task is performed correctly in the simulation, an employer is more confident the user can perform the task in an actual computer system. Simulations may also be used to prepare a student to sit for a certification exam which uses simulations. Training with simulations provides the additional benefit that the user gains realistic experience and retains the skills and knowledge learned through use of the simulation.

Unfortunately conventional simulations are not convincingly realistic. They generally include a multi-media presentation of images and user interface controls which allow very limited interaction between the user and the simulation. These simulations may provide an interface which allows an examinee to navigate through a simulated software product to the proper location to resolve a problem described in an exam question. However, these simulations only provide user interface functionality for the menus, windows, and controls necessary to navigate to a proper software window to answer the question. Because the other menus, controls, and windows do not function, an examinee may be able to find the proper window quickly by simply using trial and error, at which point answering the question or performing a task may be trivial. Such simulations are often referred to as "closed" or "dumb" simulations because of the limited functionality and navigation paths.

In contrast, an "open" or "intelligent" simulation is one which realistically simulates a computer environment within which a simulation scenario takes place. The open simulation includes logic, rules, and processing capability which allows changes made by a user in the simulation to have a corresponding effect in the simulation. In addition, the open simulation matches the behavior of the actual components of the computer environment so that a user may take multiple navigation paths to complete a task. Providing multiple navigation paths and ways of performing a task allows a user to truly "trouble shoot" a problem as will be expected in an actual computer environment. The user is free to investigate the simulated computer environment to solve a problem in a manner similar to real life.

Furthermore, conventional simulations generally do not provide functionality for recording an examinee's responses and/or interactions with the simulation. These conventional simulations are designed for presenting information, not monitoring an examinee's responses. Determining whether the examinee correctly resolved a problem presented is often rudimentary or non-existent in conventional simulations. Conventional simulators which provide limited openness simulations have other limitations as well. Generally, the data defining a simulation and/or computer environment is tightly integrated with the executable code of the simulators. Therefore, development and revisions to simulations is very expensive because this must be done by programmers instead of more cost effective test item writers. The programmers modify the actual executable code to produce different simulations.

In addition, developing truly "open" simulators which simulate each feature, function, and aspect of an actual system is very time consuming, expensive, and complex. To shorten the development cycle and hold down costs, only certain features and functions of the actual system are simulated. Consequently, conventional simulations which are available provide only limited "openness."

These problems are more pronounced in relation to computer network technologies, specifically, network devices. The main components of a computer network are the computer workstations connected to the network, and the switches and routers. The routers and switches enable network communication between computer workstations on a single network and between computers on different interconnected networks.

The routers of conventional computer networks include logic for determining how best to forward data packets from one network to another. The routers communicate with each other to ensure that data packets are forwarded most efficiently. The routers are also configurable to optimize performance. Generally, the routers include an operating system and interface which allows the router to be monitored and configured. Often the operating system and interface are proprietary. For example, Cisco Systems, Inc. of San Jose, Calif. has their own operating system and a command-line interface for their routers and switches. Routers and switches from one manufacturer are able to communicate with routers and switches from other manufacturers because the routers and switches use common networking protocols.

Unfortunately, conventional simulations for network devices, such as routers and switches from Cisco, and the network environment as a whole, suffer from similar problems as conventional simulations of computer technology. Specifically, the simulations are closed, guided, use hard-coded network configurations, and simulate limited functionality and logic for the network devices.

Accordingly, what is needed is a system and method that overcomes the problems and disadvantages of the prior art. The system and method should simulate a computer network and the network devices within the network. The system and method should simulate interactions between two or more network devices, specifically, the system and method should simulate routing tables for each simulated router. The system and method should allow authors of simulations to quickly and easily draft and revise simulations which are presented in a simulated computer network with simulated network devices. The system and method should allow actual network device configuration information to be used to configure the simulated network devices. The system and method should record user interactions with the simulated network devices to evaluate user proficiency in using and maintaining a simulated computer network.

BRIEF DESCRIPTION OF DRAWINGS

Non-exhaustive embodiments of the invention are described with reference to the figures, in which.

DETAILED DESCRIPTION OF THE PREFERRED EMBODIMENTS

Figure 1:
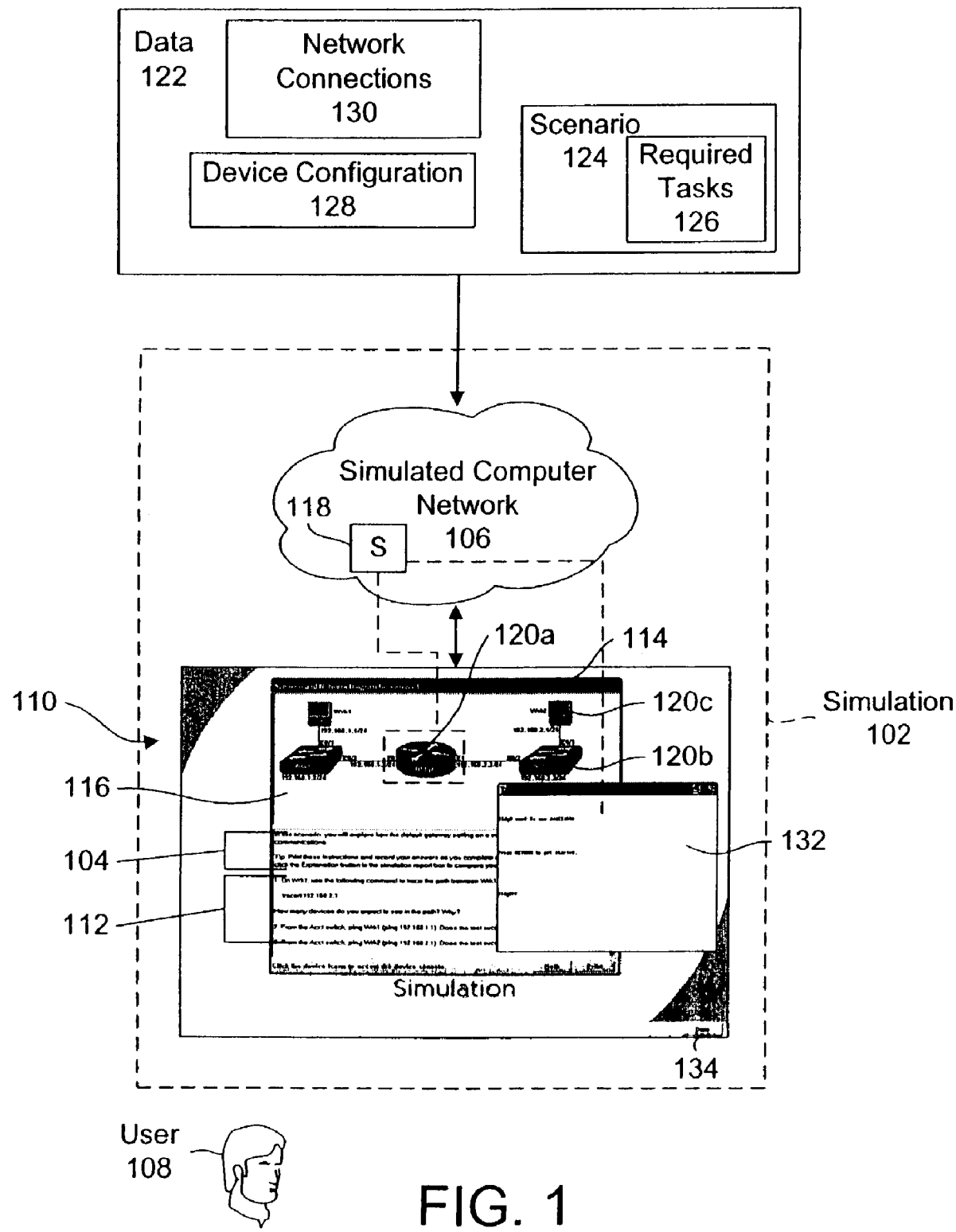
FIG. 1 is a logical relationship diagram illustrating components of one embodiment of the present invention.

The present invention relates to a system and method for simulating computer network devices for competency training and testing simulations that address all of the above-identified problems and disadvantages.

In one embodiment, a user interface is executed to present a scenario that includes a set of tasks for a user to complete pertaining to a simulated computer network. The user interface includes a network diagram having at least one icon. Each icon in the diagram represents a simulated network device configured according to configuration information.

In response to a user selecting one of the icons of the network diagram, a simulated network device associated with the selected icon is executed. A communication interface between the user and the selected simulated network device is opened. Commands issued by the user to the selected simulated network device through the communication interface are interpreted. The commands are responded to in substantially the same manner as a corresponding actual network device within an actual computer network would respond.

Preferably, the scenario and configuration information are identifiably distinct and separately modifiable from computer-executable code for the user interface, communication interface, and each simulated network device.

In another embodiment, tasks completed as a result of user issued commands to at least one selected simulated network device are monitored. The monitored tasks are preferably stored as completed tasks. Once a user initiates a finish command, the monitored tasks are evaluated to determine which tasks within the set of tasks were completed successfully by the user. Evaluation results are then formulated and presented for review.

In certain embodiments, the simulated network devices are two or more routers. A routing table for each router is generated such that each router may simulate autonomously forwarding of communication packets through the simulated computer network. The routing tables are maintained within the simulated computer network according to a routing protocol in common between the routers. The user may interact with the simulated network device in substantially the same manner as with an actual network device. Changes made in regard to one simulated network device are properly reflected in routing tables and configuration information for the simulated network device, as well as for any other affected simulated network devices in the simulated computer network.

In other embodiments, the user interface, communication interface, and each simulated network device execute in edit mode. In edit mode, a user may perform tasks and modify configuration information of simulated network devices to define or revise a simulation. The simulation editors are intuitive such that simulations using the simulated computer environment are quickly developed and revised without costly programmers.

In one embodiment, a system is provided for simulating at least one computer network device within a simulated computer network. The system includes a user interface that presents a scenario that includes a set of tasks for a user to complete pertaining to a simulated computer network. The user interface includes a network diagram with at least one icon. Each icon representing a simulated network device.

A simulator is included that simulates a network device, in response to a user selecting one of the icons of the network diagram corresponding to the network device. The simulator reads configuration information to configure the selected simulated network device, and opens a communication interface between the user and the selected simulated network device. A simulation engine drives the user interface and executes at least two simulators which cooperate with each other to simulate the computer network. The simulator interprets commands issued by the user to the selected simulated network device through the communication interface, and responds to the commands in substantially the same manner as a corresponding actual network device within an actual computer network would respond.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Referring now to FIG. 1, a block diagram illustrates logical relationships between components according to one embodiment of the present invention. In certification exams and teaching packages for network technologies, a simulation 102 of an IT scenario 104 for measuring an examinee's proficiency is preferred over conventional exam questions and techniques.

A simulation 102 is a logical construct which includes a simulated computer network 106. The simulated computer network 106 is a representation of an actual or hypothetical computer network. The simulation 102 simulates one or more hardware devices, software components, and interactions between them within a computer environment.

In FIG. 1, the computer environment is a simulated computer network 106. Simulations 102 present different combinations of hardware devices and software components having a variety of different configurations for the hardware devices and software components. Preferably, a single simulation 102 presents a single simulation-based question to a user 108, an examinee, during a certification exam. Alternatively, the same simulation 102 may be used to teach or illustrate an IT concept to the user 108 in a training package.

The simulation 102 uses a user interface 110 to interact with the user 108. Preferably, the user interface 110 is a traditional windowing interface. The user interface 110 provides a view which allows a user 108 to interact with the simulated computer network 106. The simulation 102 presents a scenario 104 to provide context for the simulation 102. The scenario 104 describes a problem or question a user 108 is to resolve. The scenario 104 may also describe the simulated computer network 106. Preferably, the scenario 104 includes a set of tasks 112 which tell a user what actions are to be completed within the simulation 102.

The tasks 112 generally do not indicate how to perform each task 112. The tasks 112 are descriptions of steps, or operations, a user 108 must complete in order to successfully complete the simulation 102. The tasks 112 may be unordered and unrelated. Alternatively, the tasks 112 may be sequential with each task 112 altering the simulated computer network 106 in some manner in preparation for the following task 112. The tasks 112 and scenario 104 may be described in a simulation window 114.

The simulation window 114 may display within the user interface 110 when a simulation 102 first starts. The simulation window 114 may include a button for soliciting help, a button for printing the scenario description 104 and task list 112, and a button for displaying an exhibit (not shown). An exhibit may display a graphic image which further aides in providing context to the user 108 in a particular simulation 102. Of course, different buttons of the simulation window 114 may be invisible or unavailable when the simulation 102 is used in a certification exam. Alternatively, additional buttons may be provided in a certification exam which are not present when the simulation 102 is presented in a training package.

Preferably, the simulation window 114 includes a network diagram 116. Alternatively, the network diagram 116 may be presented within another window of the user interface 110. A network diagram 116 is an image which illustrates one or more network devices of the simulated computer network 106. Each illustrated network device corresponds to a simulated network device 118 within the simulated computer network 106. Each network device 118 may be associated with, (as indicated by the dashed line) and represented by, an icon 120 within the network diagram 116. Alternatively, for simplicity in a simulation 102, a sub-set of the network devices 118 in the simulated computer network 106 may be represented by icons 120 in the network diagram 116.

The network diagram 116 may depict a single device 118. Alternatively, the network diagram 116 may depict a plurality of devices 118. Furthermore, the network diagram 116 may depict one or more network connections between the devices 118. The network diagram 116 provides a visual representation of devices 118 and how these devices 118 are connected within the simulated computer network 106.

A simulated network device 118 simulates the logic, features, and functionality of actual network devices which may exist within a computer network. The simulated computer network 106 may include a variety of different types of simulated network devices 118. For example, a simulated network device 118 may be a router, a switch, a workstation, or the like.

Typically, network devices are made by a variety of manufacturers. One example of a network device manufacturer is Cisco Systems Inc., of San Jose Calif. Each manufacturer's device may have different features, functions, and limitations. Accordingly, a simulated network device 118 may emulate a specific manufacturer's device. Alternatively, a single simulated network device 118 may emulate a plurality of manufacturer's network devices.

In the context of a certification exam, the certification exam is generally sponsored by a specific manufacturer. Therefore, the simulated network devices 118 may all be specific to that manufacturer. Thus, the simulated network device 118 may be a Cisco router. However, the present invention is not limited to a homogeneous set of simulated network devices 118. Network devices 118 from a variety of manufacturers may be included in the simulated computer network 106.

Generally, a simulated network device 118 comprises executable software code compiled for an all-purpose computer. Of course, the simulated network device 118 may also be interpreted code, byte code, or the like. A simulated network device 118 provides the logic, rules, features and functionality, and processing capability which emulates actual hardware devices of an actual computer network.

Preferably, where a plurality of simulated network devices 118 are included in the simulated computer network 106, the simulated network devices 118 are identifiably distinct from each other in the form of separate object-oriented computer-executable object code (i.e., separate executables). The separate simulated network devices 118 interact and cooperate to present a single complete simulated computer network 106 to a user 108.

Alternatively, the simulated network devices 118 may be integrated in one single set of computer-executable code. Those of skill in the art recognize that the simulated network devices 118, user interface 110, and other elements of the present invention may be implemented using computer-executable code which is divided and arranged in a variety of ways. Each of these ways is considered within the scope of this invention.

The computer-executable code which implements the simulated network devices 118 is separate from the data 122 which defines and configures the simulated network devices 118. The simulated network devices 118 are preferably capable of simulating a variety of different models of, and configurations for, network devices 118.

The data 122 includes all the information necessary to define and present a simulation 102. The data 122 includes scenario data 124 which includes the scenario description 104. The scenario data 124 may also include a set of required tasks 126. The required tasks 126 are data which define in a computer-readable format the tasks 112 which a user 108 is expected to perform to successfully complete the simulation 102. The required tasks 126 preferably include the task descriptions 112 which are presented to a user 108.

The data 122 also includes device configuration information 128. The device configuration information 128 includes data necessary to configure a simulated network device 118. This data may include items such as: the device type (i.e. router, switch, workstation), the device name, one or more serial interface(s), one or more ethernet interface(s), and the number and/or type of lines a device may include. In addition, the configuration information 128 may include data defining whether a particular interface is shut down, whether an interface has an IP (Internet Protocol) address, any subnet addresses may be defined, and the password and login which allow a user to interface with the device. Other configuration information 128 may define a workstation. This configuration information 128 may define the address of the network card, the name of the workstation, and other parameters for interfacing with a workstation in a network environment.

In certain embodiments, in addition to configuration information, device configuration information 128 may include a set of commands (not shown) which are defined for and operable within a particular simulated network device 118. This set of commands may define which commands a user 108 may validly issue to the simulated network device 118. By controlling this set of commands, the 'openness' or ability for a user 108 to 'roam' and perform tasks other than those required, may be limited if necessary.

Preferably, the scenario data 124 and device configuration information 128 are identifiably distinct and separately modifiable from the computer-executable code which provides the user interface 110, communication interface 132, and simulated network devices 118. Because the scenario data 124 and device configuration information 128 are separate from the computer-executable code, only the data 122 needs to be modified to develop or revise a simulation 102.

Conventionally, actual network devices such as Cisco routers and switches may be configured by reading a text file which includes substantially the same configuration information 128 as described above. The text file may be conveniently modified in a standard editor. Preferably, the format for the device configuration information 128 is substantially the same as the format used in configuration files for actual network routers and/or switches.

Consequently, in a preferred embodiment, text from an actual network device may be cut and pasted into the device configuration information 128 portion of the data 122. Alternatively, activation of a simulated network device 118 may cause an actual network device configuration file to be read to configure the simulated network device 118. In this manner, the simulated network device 118 is more realistic than if hypothetical device configuration information 128 is used. Additionally, device configuration information 128 in text format allows the device configuration information 128 to be edited directly without special editors.

The data 122 may also include network connection data 130. Network connection data 130 defines which simulated network devices 118 are connected by a 'physical' network connection. Of course, the network connection may be a wired or wireless connection.

The network connection data 130 may indicate an interface of a first simulated network device 118 which is "connected" (meaning the connection is being simulated in the simulated computer network 106) with an interface of a second simulated network device 118. Other characteristics of the network connection such as the IP address and which end of a serial interface is connected to a DTE (Data Terminal Equipment) device or a DCE (Data Communications Equipment) may also be included.

Referring still to FIG. 1, the data 122 may be stored in any suitable format or on any suitable media. Preferably, the data 122 is stored in a single file which corresponds to a particular simulation 102. Alternatively, the required tasks 126, scenario data 124, device configuration data 128, and network connection data 130 may be stored in a plurality of files. Similarly, the data 122 may be stored in a database or other data store. Of course, the data 122 may be encrypted to ensure its authenticity and prevent any tampering with the data 122. Preferably, the data 122 is stored on permanent storage media such as a hard drive, CD-ROM, DVD, or other permanent computer-readable media. Alternatively, the data 122 may be made available as needed and may be stored in temporary memory during execution of a simulation 102.

Now, operation of the embodiment of FIG. 1 will be described to further explain the present invention. Generally, when a simulation 102 is started, the user interface 110 is displayed and the simulation window 114 is provided. A user 108 may then read the scenario 104 and task 112 descriptions.

In the depicted embodiment, the network diagram 116 is an interactive image meaning a user 108 may interact directly with the diagram 116. For example, the icons 120 may be selectable using a mouse or keyboard. The user 108 may interact with the diagram 116 to complete the tasks 112 of the simulation 102. In other embodiments, the network diagram 116 may comprise a multi-media object, such as a Macromedia or Flash object, which includes animation and allows a user 108 to pan or zoom the view of the depicted simulated network devices (the icons 120). In addition, a user may re-position icons 120 and/or form network connections between icons 120.

To begin interacting with the simulation 102, the user 108 selects a network device icon 120 (selection is indicated by a dashed box around network device icon 120). For example, the user 108 may select the router icon 120a. Different network devices may be represented by different icons 120. Preferably, the icons 120 correspond to industry accepted depictions of the network devices.

In one example, upon selecting the router icon 120a, the simulated network device 118 associated with the router icon 120*a* is executed. Upon execution of the simulated network device 118, the device configuration data 128 and network connection data 130 is loaded to properly configure the simulated network device 118.

In addition, a communication interface 132 is opened between the user 108 and the simulated network device 118. Generally, a user may control and configure an actual network device through either one of two means. First, an actual physical console connected to the device including a keyboard and display terminal may allow the user to interact with the device through a command-line interface. Second, a remote terminal window (not shown) may be opened via a remote communication tool such as telnet, HyperTerminal, or other remote connection software. The remote communication tool allows the user to interact with the device as if the user were using a connected physical console. Generally, IT professionals prefer to use a remote terminal window to control and configure network devices because of convenience.

Accordingly, the communication interface 132 simulates a remote terminal window. Thus, no special physical hardware is required. Preferably, the communication interface 132 presents a command-line interface within a separate window to the user 108. The command-line interface is presented to the user 108 because this is the same type of user interface used for the corresponding actual network device. Alternatively, if a network device which is being simulated uses a graphical user interface, the communication interface 132 presents that graphical user interface.

Next, the user 108 gives the communication interface 132 focus. The user 108 may then issue commands to the simulated network device 118 in substantially the same manner as used in an actual terminal window. The association between the communication interface 132 and the simulated network device 118 is illustrated by a dashed line connecting the two. In one example, the user 108 may type text commands. Preferably, the commands available for use by the user 108 are the same commands provided in an actual interface with the network device. Alternatively or in addition, the user 108 may use arrow keys to re-issue commands stored in a command history buffer for the simulated network device 118.

The commands issued are interpreted by the simulated network device 118. Accordingly, the simulated network device 118 responds to the commands in substantially the same manner as an actual computer network device would respond. For example, if the command is invalid, the communication interface 132 would report this fact with the same error message as used in an actual network device. More importantly, if a "ping" command is issued to check connectivity to a second simulated network device (not shown) in the simulated computer network 106, the "ping" command is interpreted and an appropriate response is given based on whether the second simulated network device is connected.

Those of skill in the art recognize that a variety of different commands may exist for a particular network device. These commands are also available for a user 108 to use to interact with a simulated network device 118. Generally, these commands differ between network devices. Similarly, each type of simulated network device 118 includes a different set of available commands.

The purpose of the simulation 102 is to allow a user 108 to encounter a realistic experience in interacting with the simulated network devices 118. Therefore, the communication interface 132 is preferably identical to the interface of a corresponding actual network device. Similarly, the majority of operating systems today which allow a remote terminal window to configure and control actual network devices are multi-window environments. In a preferred embodiment, the user interface 110 also allows for multiple communication interfaces 132 to display simultaneously. (See FIG. 5) Multiple communication interfaces 132 may facilitate trouble-shooting or completing of required tasks 126. The user interface 110 may also include a button 134 which a user 108 may activate to end the simulation 102.

Figure 2:
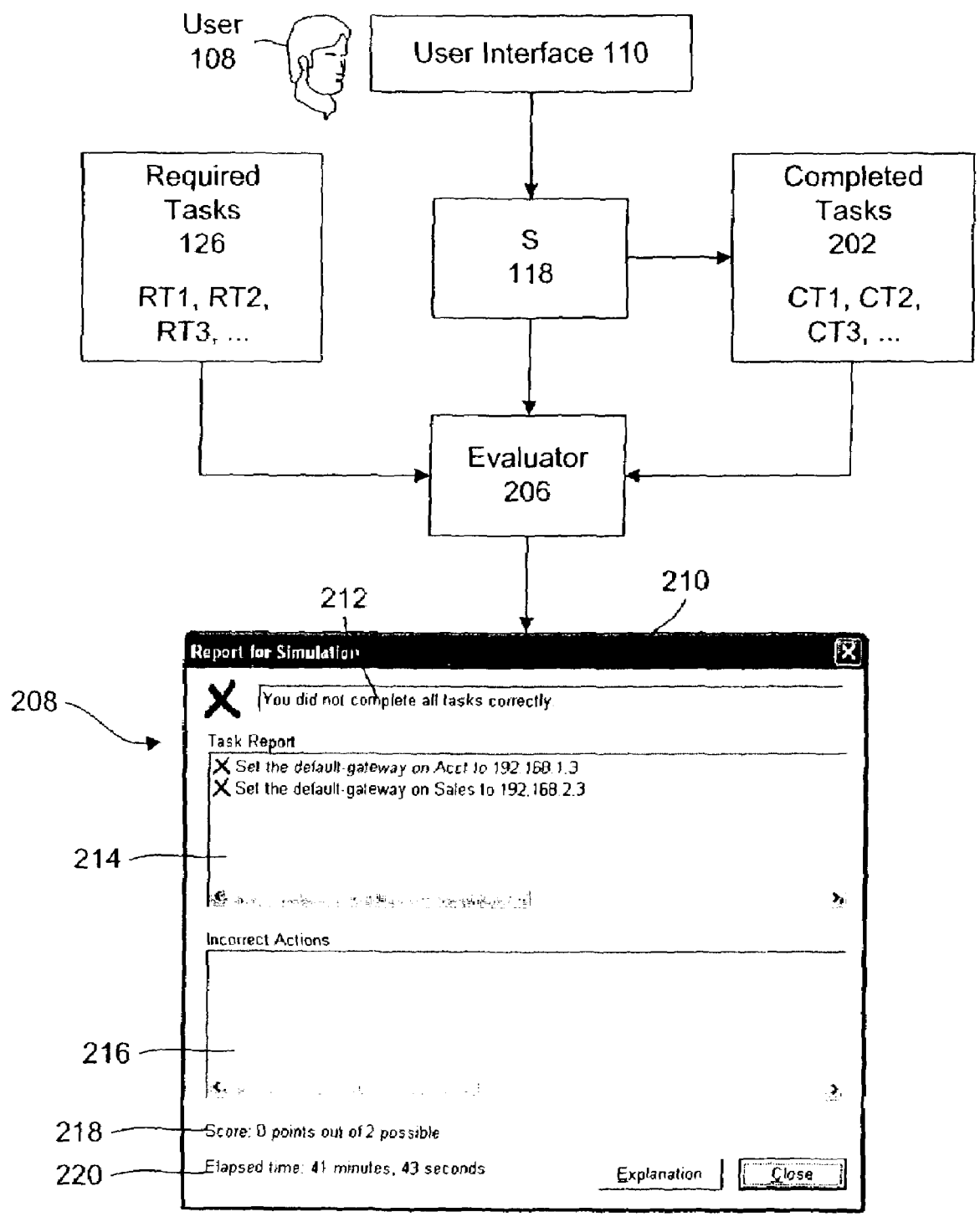
FIG. 2 is a block diagram illustrating management of tasks and evaluation of a user's performance according to certain embodiments of the present invention.

Referring now specifically to FIG. 2, another aspect of the embodiment illustrated in FIG. 1 is illustrated. Using a communication interface 132 (See FIG. 1), a user 108 learns about the configuration of the simulated computer network 106 (See FIG. 1) and the simulated devices 118 (See FIG. 1). The user 108 also uses the communication interface 132 of one or more simulated network devices 118 to change the configuration of the simulated network devices 118 in order to complete the described tasks 112 (See FIG. 1). The communication interface 132 operates within the user interface 110 (See FIG. 1). In FIG. 2, for simplicity, the user interface 110 is illustrated simply as a box.

As a user 108 issues commands to one or more simulated network devices 118, tasks which a user 108 completes are monitored and recorded. These tasks are completed tasks 202 (i.e. CT1, CT2, CT3, . . . ). Preferably, completed tasks 202 are monitored individually by each simulated network device 118. Alternatively, a separate module may monitor the completed tasks 202.

As the user 108 issues a certain command, another completed task 202 is recorded. Generally, the simulated network devices 118 are programmed to record a completed task 202 for almost any command issued. Alternatively, a sub-set of commands issued causes recording of completed tasks 202. Completed tasks 202 may include the command issued and any new settings which the command applies.

For example, a command "set default-gateway 192.168.1.3" causes the completed task 202 to be "set default-gateway," and the setting to be "192.168.1.3." Of course, more complex commands and settings are also recorded as completed tasks 202. In certain embodiments, each simulated network device 118 may record completed tasks 202 in a common location. Consequently, each completed task 202 may also include an indication of which simulated network device 118 recorded the completed task 202.

If a user 108 completes a task which is not a required task 126, the completed task 202 may still be recorded. By doing so, the incorrect completed tasks 202 may be reported to teach a user 108 what they did wrong. As long as the user 108 continues to issue commands to at least one simulated network device 118, the completed tasks 202 are monitored and recorded. Of course, the completed tasks 202 may be recorded on any suitable computer-readable media, and may be stored in long or short term memory (not shown).

When a user 108 issues a finish command, monitoring of completed tasks 202 stops. A finish command may be issued by activating the "done" button 134 in the user interface 110. In response to the finish command, the completed tasks 202 are compared with the required tasks 126.

In certain embodiments, an evaluator 206 is executed. The evaluator 206 reviews the required tasks 126 and the completed tasks 202. Each required task 126 which matches a completed task 202 is noted. In addition, the evaluator 206 may note which completed tasks 202 did not match required tasks 126. The evaluator 206 then formulates evaluation results 208. The evaluation results 208 may be presented for review in a feedback window 210. In a training package, for example, the evaluation results 208 may be presented to the user 108 (See FIG. 1).

In FIG. 2, the feedback window 210 indicates the overall result 212. The overall result 212 indicates whether the simulation 102 as a whole was completed correctly. The feedback window 210 also indicates which tasks were completed successfully 214, which completed tasks 202 were incorrect 216, what the score 218 is, and how much time was taken 220 to complete the simulation 102.

In a certification exam, for example, the evaluation results 208 may be reported to an examination authority (not shown) such as the proctor for the certification exam. The examination authority may comprise a examination proctoring computer server, special file, special software component or the like. Of course, more or less of the information included in the evaluation results 208 may be reported. For example, in certain embodiments only the score 218 may be reported.

Figure 3:
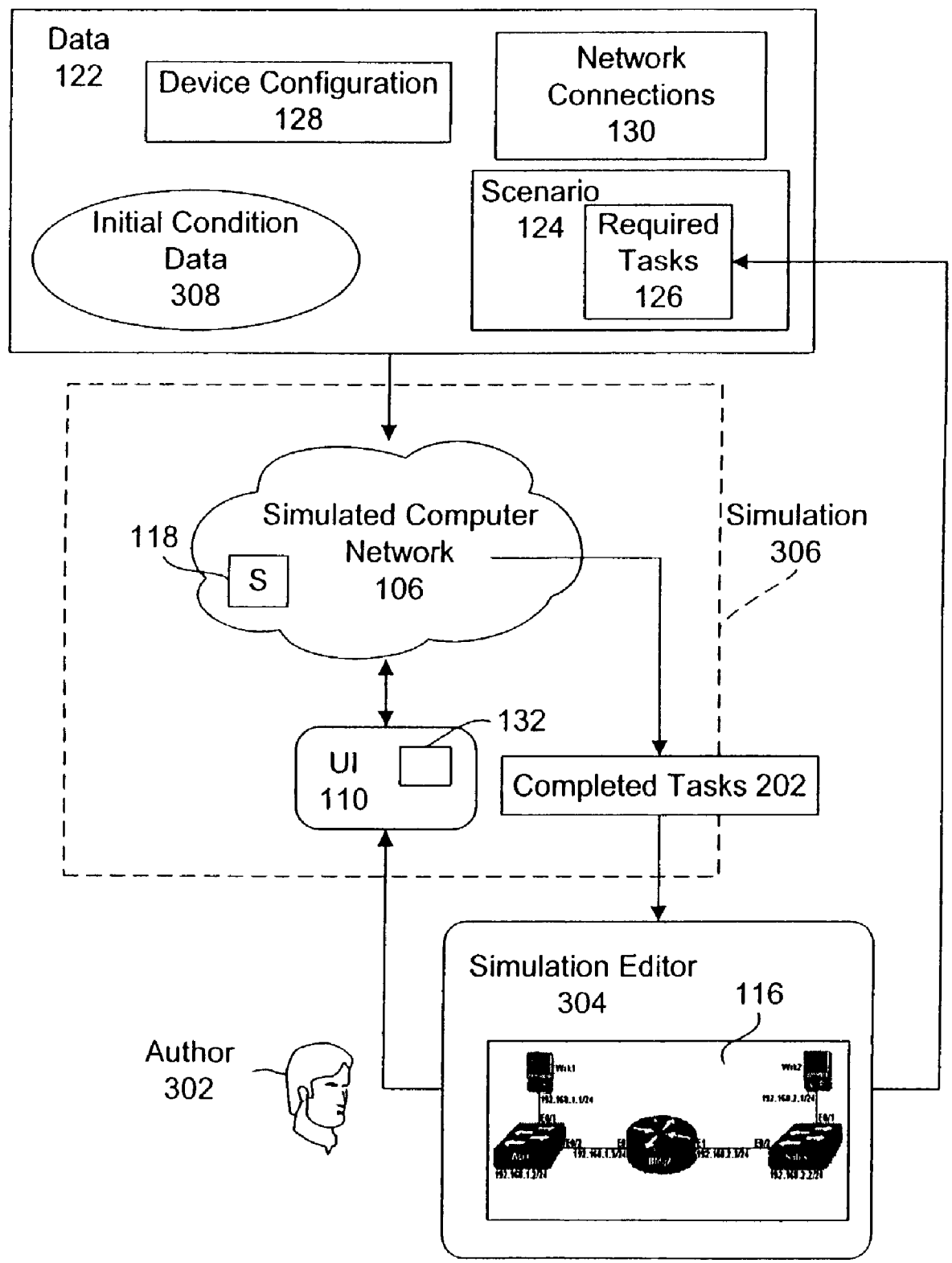
FIG. 3 is a block diagram illustrating composition of a simulation by an author interacting with a simulated computer network.

FIG. 3 illustrates an author 302 interacting with computer-executable code simulating the simulated computer network 106 in order to develop and/or revise a simulation 306.

In a preferred embodiment, the author 302 executes a simulation editor 304. The simulation editor 304 is computer-executable code designed for creation and modification of simulations 102 for one or more IT environments. For example, a simulation editor 304 may create simulations 102 for a Windows 2000® Operating System environment, a Cisco® network environment, or the like. Alternatively, the simulation editor 304 may be tailored for a single IT environment.

Regarding simulations 102 which simulate network devices of a simulated computer network 106, certain preparations may be required before a simulation 102 may be created. Specifically, a network diagram 116 may be created using tools separate from the simulation editor 304. For example, an interactive image creation program (not shown) may be used to create a network diagram 116. Of course, those of skill in the art recognize that functionality for building the network diagram 116 may be incorporated in the simulation editor 304 by direct integration, as a plugin module, or the like.

The network diagram 116 is preferably an image (not shown) of one or more network devices and connections between the devices. In addition, the network diagram 116 may include information describing the IP addresses, the type of connections between depicted devices, and other pertinent information.

Using conventional image tools, portions of the image may be designated as "hot-spots." Preferably, each hot-spot surrounds a depicted network device. Each hot spot is also associated with an event. For example, when a mouse-click occurs within the hot spot an event is initiated. The event may be to send a message to another program, or to execute a specific program. For example, when a hot spot around a router is clicked, executable file "router.exe" may be executed.

In certain embodiments, hot spots of the image which are associated with an event comprise the selectable icons 120 discussed above. Once all desired selectable icons 120 are defined, the network diagram 116 may be complete. The finished network diagram 116 may then be stored as an interactive image.

The simulation editor 304 includes a plurality of tools to assist an author 302 in creating and revising simulations 102. The author 302 identifies an appropriate network diagram 116 and may name the simulation 102. Preferably, the editor 304 provides a tabbed window interface (not shown). Within one tab the author 302 may draft the scenario description 104. In another tab, the author 302 may define the network connection data 130 and device configuration information 128 for each simulated network device 118. In still another tab, an author 302 may manually compose a set of required tasks 126 for the simulation 102.

However, in a preferred embodiment, to define a new simulation 102, a user defines required tasks 126 in an automated fashion. First, an author 302 designates a network diagram 116 for the simulation. Next, in response to an author's 302 command, a user interface 110 for an editable simulation 306 is executed. An editable simulation 306 is a simulation 102 which is being edited or developed. In an editable simulation 306, the user 108 (See FIG. 1) is the author 302.

Each component of a simulation 102 as described in relation to FIG. 1 is operable. However, components such as the user interface 110, communication interface(s) 132, and/or simulated network device(s) 118 operate in "edit mode." Edit mode means that any tasks performed by the author 302 are recorded for use in defining the simulation 102. In another embodiment, any modifications to the configurations of the simulated network devices 118 may also be recorded to define the device configuration information 128 for the simulation 102.

The user interface 110 displays a simulation window 114 (See FIG. 1) which includes the designated network diagram 116. Then, any parts of the editable simulation 306 which have previously been defined are included and presented. For example, if a scenario 104 has been defined, the scenario 104 is displayed with the network diagram 116 in the simulation window 114. If not, a blank space may display to indicate that the scenario description 104 needs to be defined.

As in the simulation 102, an author 302 may select an icon 120 of the network diagram 116, execute the associated simulated network device 118, and open a communication interface 132 with the simulated network device 118. If device configuration information 128 has not yet been defined, a default set of configuration information 128 may be loaded. Generally, the default set of configuration information 128 is sufficient configuration information to allow an author 302 to issue commands and perform tasks in relation to the simulated network device 118. Default configuration information 128 may be available for each type of network device 118. Default configuration information 128 may include a set of commands available, a default password, a type and version identifier for the simulated network device 118, and the like.

Tasks performed by the author 302 may be stored as completed tasks 202 using substantially the same functionality and methods as used in relation to embodiments described in relation to FIG. 2. These completed tasks 202 may be stored in temporary memory (not shown) or temporarily recorded on computer-readable media (not shown). The author 302 is free to perform as many tasks 202 as desired.

When an author 302 exits the user interface 110, the completed tasks 202 are made available to the simulation editor 304. For example, the completed tasks 202 may be loaded from a data store (not shown) and presented to the author 302. Within the simulation editor 304, a window (not shown) may allow the author 302 to choose which completed tasks 202 are to become required tasks 126 within the finished simulation 102. In addition, the author 302 may draft a task description 112 for each required task 126. In certain embodiments, a score, or point value may also be associated with each required task 126. When an editable simulation 306 is saved, the required tasks 126 may be stored with the scenario data 124 described above.

In an alternative embodiment, the present invention includes initial condition data 308. In certain simulations 102, it may be desirable to maintain a constant configuration for the simulated computer network 106 for a series of simulations 102. However, certain minor aspects of the computer network 106 may differ between the simulations 102. If a new set of data 122 is created for each simulation 102, the majority of the data 122 is duplicated unnecessarily.

Therefore, initial condition data 308 which is associated with a particular simulation 102 may be defined. Initial condition data 308 represents a relatively minor change in the data 122 which may have a significant impact on the simulated computer network 106.

For example, two simulated routers (not shown) may be configured by the data 122 to allow network communication within the simulated computer network 106. This may mean, among other data, that each router has an IP address which the other uses to conduct network communication. An author 302 may use the initial condition data 308 to change one router's IP address. The change may be a single digit of the IP address. Due to this small change, the routers may no longer be able to conduct network communication within the simulated computer network 106. The simulation 102 may include a task 126 which requires the user 108 (See FIG. 1) to resolve the problem by changing the proper IP address.

Generally, the data 122 will be defined to present a simulated computer network 106 which functions properly. Initial condition data 308 may be used to change the data 122 such that a configuration error or problem is introduced into the simulated computer network 106. The simulation editor 304 may include a window or tab which allows an author 302 to define initial condition data 308.

Computer networks can be very complex. Computer networks allow data from a source computer to be transferred to a destination computer on the same or a different network. Once the data is sent from the source computer, the network devices manage transmitting the data to the destination computer. A router is an important part in this transfer. A router passes data from a source network to a destination network. The router does this without any user intervention. Instead, each router uses information about the data traveling across the network, about the configuration of network, and about which other network devices are connected to the router to effectuate the data transfer.

Conventional routers perform a single main function. For every packet of data which the router receives, the router determines which network device the data packet should be sent to next to provide the fastest and/or most reliable delivery of the data packet. Determining the next device to send the data packet to is accomplished using routing tables.

A routing table is a compilation of routes to various network devices for which a path exists through the network from the particular router. When determining where to send a data packet, a router will review its routing table. Based on the destination network device for the data packet, the router determines if it has a route to the intended destination network device. If a direct route exists, the data packet is sent to the identified network device for the destination network, generally another router. If an indirect route exists, the router sends the data packet to the next stop in the route.

Typically, a routing table is a tabular data structure in which each row holds route information. The destination network device may be connected directly or indirectly through one or more networks to the router. The route information may include a field for the destination type, address mask, path type, cost, and a variety of other data fields. The router generally uses an algorithm to determine which route to select from the routing table. Various algorithms may be implemented. In a most basic algorithm, the routing table is scanned for a match of the destination network's address. If found, the packet is forwarded to the identified network device or next device in the indirect route.

One advantage to using routing tables is that information about existing actual connections between devices does not need to be maintained. Physical connections between routers may be interrupted by a storm, fire, a cut wire and the like. However, the network may continue to pass data packets between all of the network devices because alternative routes are included in the routing table.

The routing tables are dynamic. Typically, each router periodically transmits information from its routing table to all connected network devices. As this information is shared, the receiving routers update or add to their routing tables. In this manner, the routing tables may be constantly changing and are maintained to enable the routers to maintain network communications without user intervention.

Conventionally, in a simulation, the simulated network devices respond when requests or actions are performed on them by a user rather than by operating autonomously. However, actual routers generally operate autonomously and share routing information independent of each other or of user commands. Consequently, a dynamic process such as routing table creation, maintenance, and sharing is not conventionally simulated.

Figure 4:
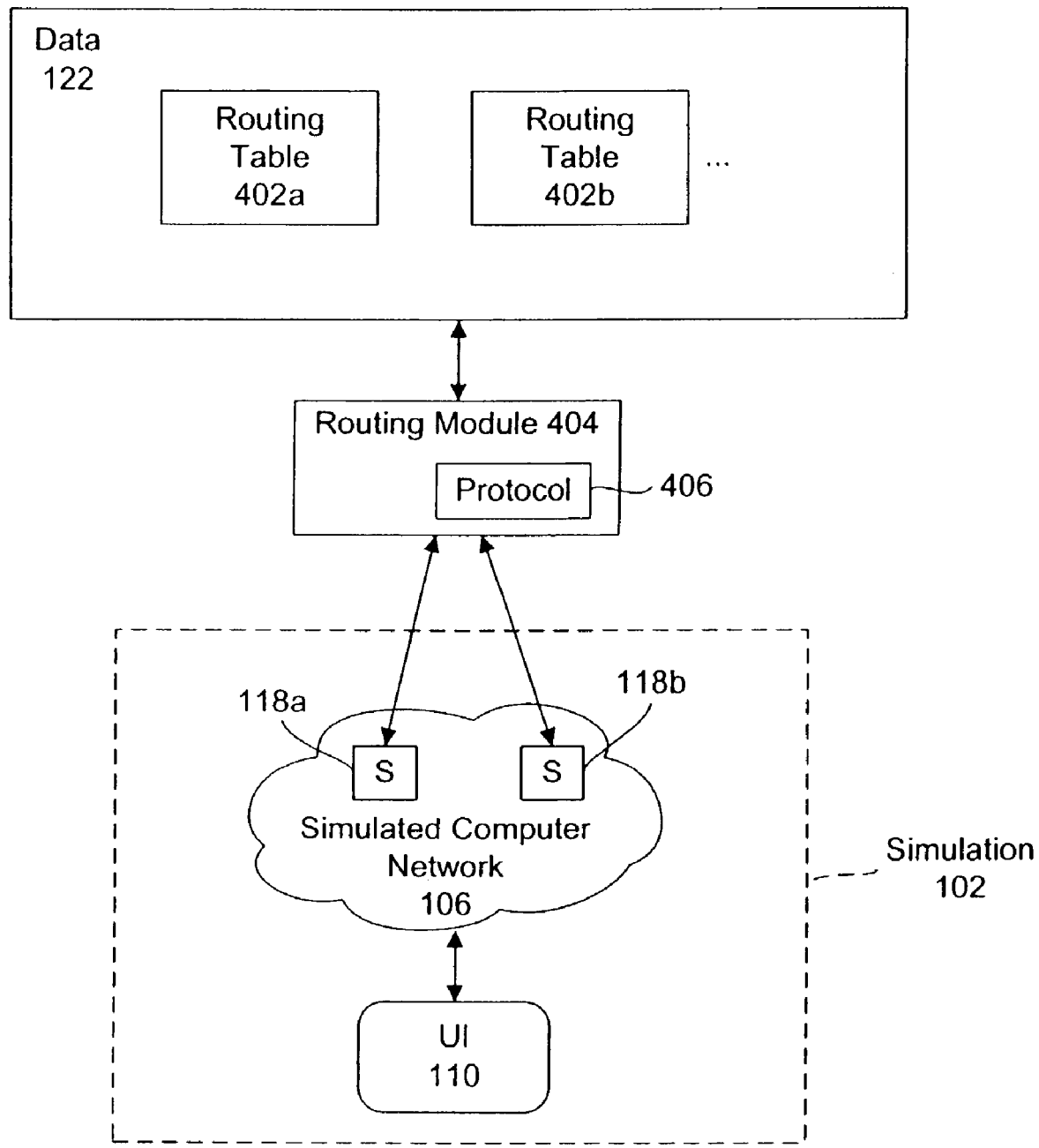
FIG. 4 is a block diagram illustrating simulation of routing tables for at least two simulated network devices.

Referring now to FIG. 4, in a preferred embodiment, routing tables 402 are generated for each simulated network device 118a–b which simulate network routers 118a–b. Preferably, the routers 118a–b comprise separate and distinct sets of computer-executable code. A routing module 404 may be provided to generate and manage a separate routing table 402a–b for each router 118a–b.

The routing module 404 generates routing tables 402a–b when the simulation 102 initiates. The routing tables 402a–b may be stored with the data 122 in permanent storage. Alternatively, the routing tables 402a–b may exist temporarily in volatile memory (not shown). A routing table 402 is generated for each simulated router 118a–b which could be executed and interacted with by a user 108 (See FIG. 1). Even though a specific router 118 is not executed, its corresponding routing table 402 must be created and maintained to provide a realistic simulated computer network 106.

When a user 108 does execute a particular router 118a and opens a communication interface 132 (See FIG. 1), the corresponding routing table 402a allows the router 118a to simulate autonomous forwarding of communication packets (data packets) through the simulated computer network 106. For example, a user 108 may issue a "ping" command to check whether another router 118b is connected within the simulated computer network 106. The executed router 118a may use the routing table 402a to determine an appropriate response to the ping command. Forwarding of packets is simulated by referencing the routing table 402a.

As mentioned above, actual routers communicate routing information from their routing tables with each other dynamically. In addition, actual routers pass data packets across physical connections of the network. Actual communication of routing information and data packets in a simulation 102 between simulated network devices 118a–b is generally unnecessary in a simulation 102.

However, more complex simulations 102 may require a realistic simulation of transfer of data through physical connections, including delay times. The present invention includes embodiments in which delays and other characteristics of actual physical transfer of the data packets and routing information is simulated.

In one embodiment, inter-router communication of simulated data packets and routing table information may be managed by the routing module 404. A "ping" or "trace route" command issued to a simulated router 118a may cause the routing module 404 to review one or more routing tables 402a–b to determine how execution of the command should be simulated. If the routing tables 402a–b indicate that the command would or would not be successful, then appropriate feedback is provided to the user 108.

Of course, the routing module 404 may be implemented in various ways each well known to those of skill in the art. For example, the routing module 404 may comprise a separate set of computer-executable code. Alternatively, the routing module 404 may comprise a common set of computer-executable code which is shared between the simulated routers 118a–b.

In another alternative, the functionality of the routing module 404 may be integrated with each simulated router 118a–b. Each simulated router 118a–b may communicate data packets and/or routing information using interprocess messages (not shown). The messages may be sent using windows messages, Dynamic Data Exchange (DDE), and/or Object Linking and Embedding (OLE).

As mentioned above, actual routing tables are dynamic. The routing tables generally change periodically as interconnected routers broadcast routing table information to other routers on the network. Alternatively, the routers may broadcast routing information when the configuration or connection information for the router changes. The routing tables essentially contain information about the network topology. The process of exchanging this routing table information is referred to as convergence. Convergence between routers should happen quickly such that each router has current information in its routing table.

In certain embodiments of the present invention, dynamic convergence of routing information between simulated routers 118a–b occurs periodically. However, periodic updates to the routing tables 402a–b is not necessary in most simulations 102, because the simulation 102 is designed for a single-user environment. Information regarding routing changes when the user 108 (See FIG. 1) issues a command. However, simulations 102 in which multiple users 108 interact within the simulated computer network 106 are considered within the scope of the present invention. In such simulations, periodic sharing of routing table information may be simulated.

In FIG. 4, the routing information is shared between simulated routers 118a–b based on a cause-and-effect model. If a user 108 issues a command to a simulated router 118a and the command would cause routing tables 402a–b for that router 118a and/or one or more simulated routers 118b to be changed, the routing module 404 modifies each of the affected routing tables 402a–b. In this manner, the configuration of the simulated computer network 106 remains realistic, while the complexity of maintaining the routing tables 402 and inter-router communication is simplified. However, the user 108 receives the perception that a fully operating, dynamic, functional computer network exists within the simulation 102. The simulation of routing tables 402a which are generated and dynamically maintained allows the simulation 102 to be open. A user 108 can issue commands, and get a realistic response for the command.

Actual routers exchange routing information and maintain their routing tables according to a routing protocol. The routing protocol determines such factors as a schedule for sharing routing information, what information is shared and how the information is broadcast between routers.

Similarly, in FIG. 4, the routing module 404 maintains the routing tables 402a–b according to a routing protocol 406. Common routing protocols 406 include RIP (Routing Information Protocol), GRIP (Globally Resilient Internet Protocol), OSPF (Open Shortest Path First), IPX (Internetwork Packet eXchange) IGRP (Interior Gateway Routing Protocol), and the like. Of course, the logic required to implement each routing protocol 406 may differ slightly in embodiments which do not transmit actual data packets or routing information. However, the routing protocols 406 are simulated such that for a given set of input conditions in an actual computer network the same output conditions result in the simulated computer network 106.

Preferably, the routing protocols 406 may be enabled, un-enabled, installed, and uninstalled in relation to one or more interfaces of each of the simulated network devices 118a–b. Preferably, the routing protocols 406 in use are controlled either by device configuration information 128 (See FIG. 1) or commands issued by a user 108 to the simulated network device 118. Thus, while a number of protocols 406 may be available, which protocol 406 is used may be determined by a user's actions within the simulation 102.

Figure 5:
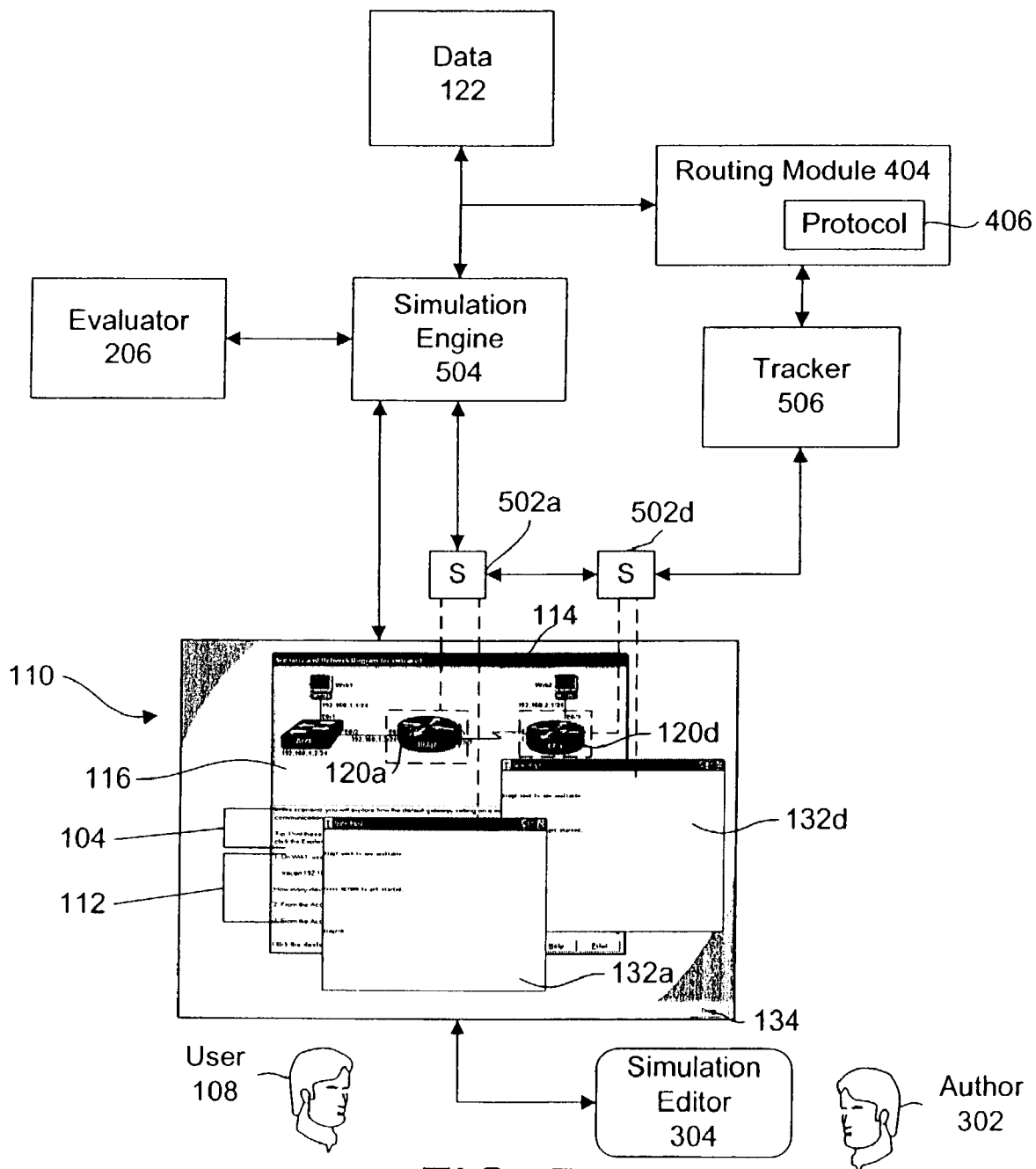
FIG. 5 is a block diagram of a system which simulates a computer network comprising at least two simulated network devices.

Referring now specifically to FIG. 5, and generally to FIG. 1, a system 500 is provided which implements one embodiment of the present invention. The system 500 includes data 122 and a routing module 404 similar to those discussed above. The system 500 also includes a user interface 110. As described in relation to FIG. 1, the user interface 110 includes a scenario 104 and task description 112. A network diagram 116 including icons 120a,d provides an interactive view of the topology of the simulated computer network 106.

At least two of the icons 120a,d are selectable by a user 108. Each icon 120a,d is associated with a simulator 502a,d which simulates a computer network device 118. Selection of an icon 120a activates the corresponding simulator 502a.

Preferably, a simulator 502 is a separate and identifiably distinct set of computer-executable code which has substantially the same features and functionality as the simulated computer device 118 described above in relation to FIG. 1. Alternatively, a single simulator 502 may instantiate separate objects to represent each simulated network device 118.

Generally, each simulator 502a,d corresponds to a particular simulated network device 118 defined by the data 122 for the simulated computer network 106. A simulator 502 reads configuration information 128 within the data 122 to configure and define the selected simulated network device 118. Each selected simulator 502 opens a communication interface 132a,d with the user 108.

Note that in FIG. 5, the network diagram 116 allows a user 108 to select a plurality of icons 120a,d and open a corresponding plurality of communication interfaces 132a,d (indicated by dashed lines). Preferably, the communication interfaces 132a,d are windows which are simultaneously displayable in a multi-window user interface 110. Of course, each window may be re-sized, maximized, minimized and re-positioned as desired by the user 108.

The system 500 includes a simulation engine 504. The simulation engine 504 drives the user interface 110. The simulation engine 504 presents the simulation window 114, receives user interface commands and responds appropriately. The simulation engine 504 receives user selections of icons 120a,d in the network diagram 116.

In response, the simulation engine 504 executes the appropriate simulators 502. The simulators 502 cooperate as described above to simulate the computer network 106. Each simulator 502a,d interprets commands issued within the corresponding communication interface 132a,d. In response to these commands, the simulator 502 responds in substantially the same manner as a corresponding actual network device in an actual computer network.

The simulation engine 504 is in communication with an evaluator 206. As mentioned above in relation to FIG. 2, the evaluator 206 reviews the required tasks 126 and the completed tasks 202. The evaluator 206 is initiated by a finish command executed by the user 108 activating a 'done' button 134.

The simulation engine 504 is also in communication with a tracker 506. A tracker 506 monitors the tasks 202 which are completed (See FIG. 2) by a user 108 issuing commands to a simulated network device 118 (which is simulated by the simulators 502a,d). As discussed in relation to FIG. 2, these completed tasks 202 may be recorded such that an evaluator 206 may review them.

The routing module 404 of the system 500 generates and maintains routing tables 402 (See FIG. 4). The routing tables 402 and associated routing protocols 406 allow the simulated network devices 118 to respond to user commands in a very realistic manner based on the configuration information 128 of each simulated network device 118. Even simulated network devices 118 for which the user 108 has not selected an icon 120 are involved in generating and maintaining the routing tables 402.

In certain embodiments, the system 500 includes a simulation editor 304 (See FIG. 3). The simulation editor 304 functions in substantially the same manner as the simulation editor 304 described in relation to FIG. 3. The simulation editor 304 allows an author 302 to interact with the system 500, and to compose and revise required tasks 126 for a simulation 102 (See FIG. 1). By interacting with the system 500 in a similar manner to that of a user 108, the author 302 operates within the same user interface 110 and can quickly complete the tasks 126 which will be required in the simulation 102.

Figure 6:
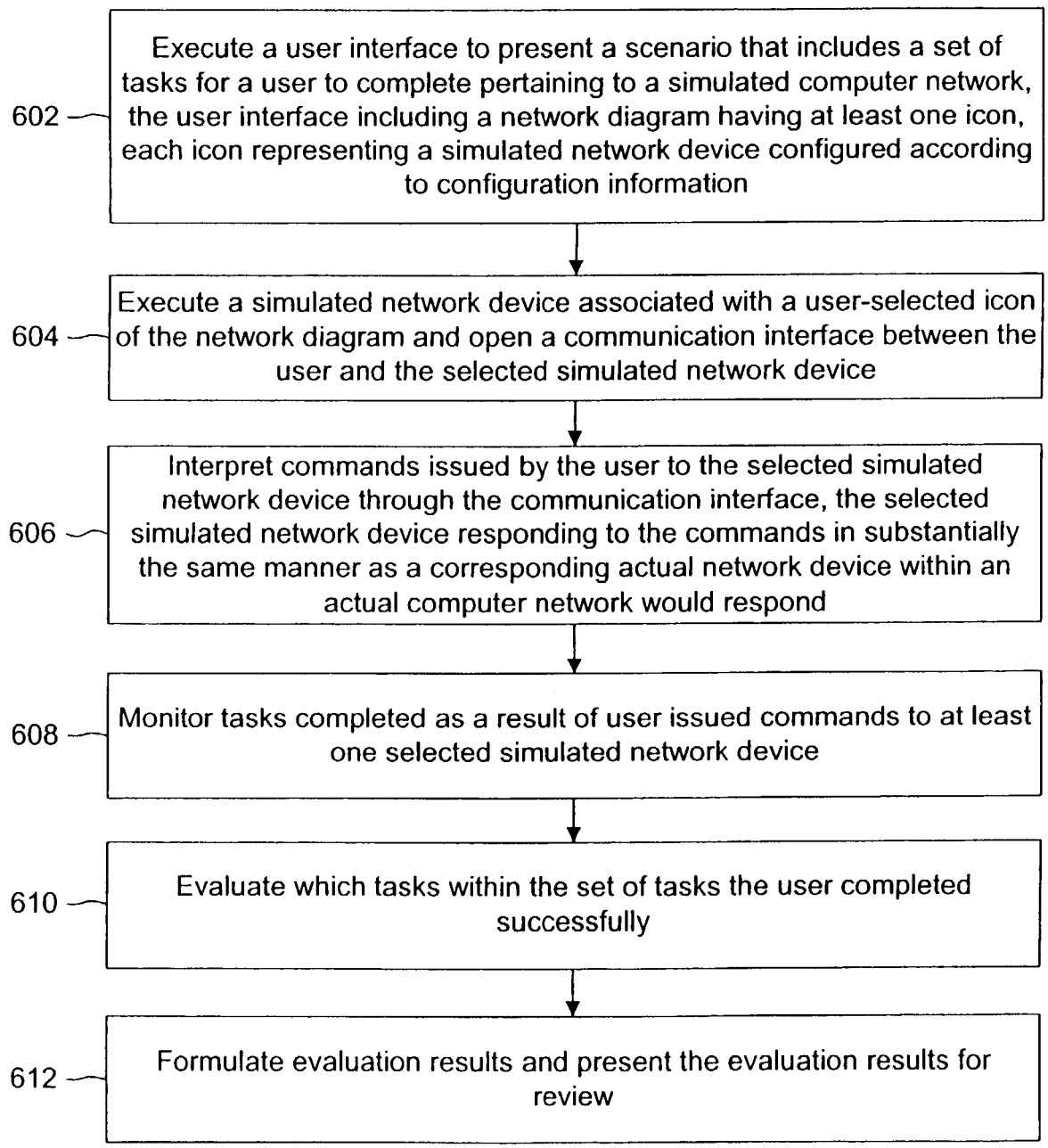
FIG. 6 is a flowchart of a method for simulating computer network devices within a simulated computer network.

FIG. 6 illustrates a flowchart of a method 600 for simulating computer network devices within a simulated computer network 106. The method 600 begins by executing 602 a user interface 110 to present a scenario 104 that includes a set of tasks 112 for a user 108 to complete pertaining to a simulated computer network 106. The user interface 110 includes a network diagram 116 having at least one icon 120. Each icon 120 represents a simulated network device 118 configured according to configuration information 128.

In response to the user 108 selecting one of the icons 120 of the network diagram 116, a simulated network device 118 associated with the selected icon 120 is executed 604. In addition, a communication interface 132 is opened between the user 108 and the selected simulated network device 118. In certain embodiments, more than one icon 120 may be selected and more than one communication interface 132 may be opened.

Thereafter, commands issued by the user 108 to the selected simulated network device 118 are interpreted 606 and responded to in substantially the same manner as a corresponding actual network device within an actual computer network would respond.

In certain embodiments, tasks 202 which are completed by the user 108 issuing commands to the selected simulated network device 118 are monitored 608. The monitored completed tasks 202 may be stored in permanent storage. Next, in response to a user-initiated finish command, completed tasks 202 are evaluated 610 to determine which tasks 126 the user 108 successfully completed. And finally, evaluation results are formulated 612 and presented for review by a user 108 or examination authority.

Based on the foregoing, the present invention offers a number of advantages not available in conventional approaches. The present invention simulates a dynamic computer network and network devices therein. The present invention simulates interactions between two or more network devices and dynamic routing tables associated with the simulated network devices. The present invention allows a simulation author to compose possible required tasks for a simulation by interacting with the simulated computer network. The present invention records user interactions with the simulated network devices to evaluate user proficiency using and maintaining the simulated computer network.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for simulating computer network devices within a simulated computer network, the method comprising:

executing a user interface to present a scenario that includes a set of testing and training tasks for a user to complete pertaining to a simulated computer network, the user interface including a network diagram having at least one icon, each icon representing a simulated network device configured according to configuration information;

in response to a user selecting one of the icons of the network diagram, executing a simulated network device associated with the selected icon and opening a communication interface between the user and the selected simulated network device; and interpreting commands issued by the user to the selected simulated network device through the communication interface, the selected simulated network device responding to the commands in substantially the same manner as a corresponding actual network device within an actual computer network would respond.

2. The method of claim 1, further comprising:

monitoring tasks completed as a result of user issued commands to at least one selected simulated network device;

in response to a user-initiated finish command, evaluating which tasks within the set of tasks the user completed successfully; and formulating evaluation results and presenting the evaluation results for review.

3. The method of claim 2, wherein the results of the evaluation are presented to the user.

4. The method of claim 2, wherein the results of the evaluation are presented to an examination authority.

5. The method of claim 1, wherein the scenario and configuration information are identifiably distinct and separately modifiable from computer-executable code which provides the user interface, communication interface, and simulates each simulated network device.

6. The method of claim 5, wherein the configuration information is in substantially the same format as the format of configuration files for actual network devices.

7. The method of claim 1, wherein the simulated computer network comprises at least two simulated network devices which are routers, the method further comprising:
generating a routing table for each router that allows each router to simulate autonomous forwarding of communication packets through the simulated computer network; and
maintaining the routing tables according to a routing protocol which is common among the routers.

8. The method of claim 7, wherein the routing protocol is selected from the group comprising RIP, GRIP, OSPF, IPX, and IGRP.

9. The method of claim 1, wherein the user interface, communication interface, and each simulated network device execute in edit mode such that tasks performed by the user are stored for use in a simulation editor to define a simulation comprising the tasks.

10. The method of claim 1, wherein each simulated network device is selected from the group comprising a router, a switch, and a workstation.

11. The method of claim 1, wherein the communication interface comprises a command-line interface.

12. The method of claim 1, wherein the network diagram comprises an interactive image.

13. The method of claim 1, wherein the simulated network device is a CISCO router.

14. A method for simulating a plurality of computer network devices within a simulated computer network, the method comprising:
executing computer-executable code which simulates a plurality of network devices defined by a data store which is distinct and separately modifiable from the computer-executable code, the data store defining the configuration information for, and
network connections between each simulated network device within the simulated computer network;
displaying a network diagram which represents the simulated computer network and includes icons associated with each of the simulated network devices;
in response to a user selecting an icon of the network diagram, executing a communication interface for a simulated network device associated with the selected icon; and
monitoring and storing tasks completed by the user interacting with the selected simulated network device.

15. The method of claim 14, wherein the plurality of network devices comprises a router, a switch, and a workstation.

16. The method of claim 14, wherein the completed tasks are loaded by a simulation editor to allow an author to draft a simulation defined in the data store which includes a set of tasks corresponding to the loaded interactions.

17. The method of claim 16, wherein the simulation editor allows an author to draft a simulation comprising initial condition data which modifies data in the data store to define a customized simulation.

18. The method of claim 14, wherein the completed tasks are compared with a set of required tasks defined for a simulation to determine how successfully the user completed the required tasks.

19. A system for simulating at least one computer network device within a simulated computer network, the system comprising:
a user interface that presents a scenario which includes a set of testing and training tasks for a user to complete pertaining to a simulated computer network, the user interface including a network diagram having at least one icon, each icon representing a simulated network device;
a simulator that simulates a network device, in response to a user selecting one of the icons of the network diagram corresponding to the network device, the simulator reads configuration information to configure a simulated network device associated with the selected icon and opens a communication interface between the user and the simulated network device;
a simulation engine that drives the user interface and executes at least two simulators which cooperate with each other to simulate the computer network;
wherein the simulator interprets commands issued by the user to the selected simulated network device through the communication interface and responds to the commands in substantially the same manner as a corresponding actual network device within an actual computer network would respond.

20. The system of claim 19, further comprising:
a tracker that monitors tasks completed as a result of the user issued commands to at least one selected simulated network device; and
an evaluator that evaluates which tasks the user completed successfully and presents results of the evaluation for review in response to a user-initiated finish command.

21. The system of claim 19, wherein the results of the evaluation are presented to the user.

22. The system of claim 19, wherein the scenario and configuration information are identifiably distinct and separately modifiable from the user interface and simulator.

23. The system of claim 19, wherein the configuration information is in substantially the same format as the format of configuration files for actual network devices.

24. The system of claim 19, wherein the simulator simulates a first router, the system further comprising:
a second simulator which simulates a second router, the second simulator reading configuration information to configure the second router;
a routing module to generate a first routing table for the first router and a second routing table for the second router such that each router is capable of simulating autonomous forwarding of communication packets through the simulated computer network; and
wherein the routing module maintains the routing tables according to a routing protocol which is common between the first router and the second router.

25. The system of claim 24, wherein the routing protocol is selected from the group comprising RIP, GRIP, OSPF, IPX, and IGRP.

26. The system of claim 19, wherein the user interface, communication interface, and simulator execute in edit mode such that tasks completed and configuration information modified by the user are stored for use in a simulation editor to define a simulation comprising the completed tasks and configuration information.

27. The system of claim 19, wherein the communication interface comprises a command-line interface.

28. A computer-readable medium containing instructions for simulating at least one computer network device within a simulated computer network, wherein the instructions comprise executable instructions for implementing a method comprising:

executing a user interface to present a scenario that includes a set of testing and training tasks for a user to complete pertaining to a simulated computer network, the user interface including a network diagram having at least one icon, each icon representing a simulated network device configured according to configuration information;

in response to a user selecting one of the icons of the network diagram, executing a simulated network device associated with the selected icon and opening a communication interface between the user and the selected simulated network device; and interpreting commands issued by the user to the selected simulated network device through the communication interface, the selected simulated network device responding to the commands in substantially the same manner as a corresponding actual network device within an actual computer network would respond.

29. A computer-readable medium containing instructions for simulating a plurality of computer network devices within a simulated computer network, wherein the instructions comprise executable instructions for implementing a method comprising:

executing computer-executable code which simulates a plurality of network devices defined by a data store which is distinct and separately modifiable from the computer-executable code, the data store defining the configuration information for, and network connections between each simulated network device within the simulated computer network;

displaying a network diagram which represents the simulated computer network and includes icons associated with each of the simulated network devices;

in response to a user selecting an icon of the network diagram, executing a communication interface for a simulated network device associated with the selected icon; and monitoring and storing tasks completed by the user interacting with the selected simulated network device.

30. A method for simulating at least one computer network device within a simulated computer network, the method comprising:

displaying a user interface including a network diagram of at least one icon representing a simulated network device;

in response to a user selecting an icon of the network diagram, executing a corresponding simulated network device configured according to configuration information and opening a communication interface between the user and the corresponding simulated network device;

in response to a user command, displaying, by way of the user interface, a scenario that includes a set of testing and training tasks for a user to complete pertaining to a simulated computer network; and interpreting commands issued by the user to the selected simulated network device through the communication interface, the selected simulated network device responding to the commands in substantially the same manner as an actual network device within an actual computer network corresponding to the simulated computer network.

31. A method for simulating at least one computer network device within a simulated computer network, the method comprising:

executing a user interface to present a scenario that includes a set of testing and training tasks for a user to complete pertaining to a simulated computer network, the user interface including a communication interface associated with a simulated network device within the simulated network environment;

in response to a user selecting a communication interface, executing an associated selected simulated network device configured according to configuration information; and interpreting commands issued by the user to the selected simulated network device through the communication interface, the selected simulated network device responding to the commands in substantially the same manner as a corresponding actual network device within an actual computer network would respond.

* * * * *